United States Patent
Desineni et al.

(10) Patent No.: US 9,652,209 B2
(45) Date of Patent: *May 16, 2017

(54) STATIC ANALYSIS AND RECONSTRUCTION OF DEEP LINK HANDLING IN COMPILED APPLICATIONS

(71) Applicant: Quixey, Inc., Mountain View, CA (US)

(72) Inventors: Kalyan Desineni, Mountain View, CA (US); Manikandan Sankaranarasimhan, Hayward, CA (US); Danny Tsechansky, Mountain View, CA (US); Matan Levi, Mountain View, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,277

(22) Filed: Aug. 24, 2016

(65) Prior Publication Data

US 2017/0046141 A1  Feb. 16, 2017

Related U.S. Application Data

(63) Continuation of application No. 14/984,642, filed on Dec. 30, 2015.
(Continued)

(51) Int. Cl.
*G06F 9/45* (2006.01)
(52) U.S. Cl.
CPC ...................................... *G06F 8/53* (2013.01)
(58) Field of Classification Search
None
See application file for complete search history.

(56) References Cited

U.S. PATENT DOCUMENTS

| | | | |
|---|---|---|---|
| 8,510,764 B1 | 8/2013 | Deselaers et al. | |
| 2007/0214097 A1* | 9/2007 | Parsons | G06F 17/30864 706/12 |

(Continued)

OTHER PUBLICATIONS

Written Opinion for PCT Application No. PCT/IB2016/054877, dated Nov. 28, 2016, 6 pages.

*Primary Examiner* — Isaac T Tecklu
(74) *Attorney, Agent, or Firm* — Harness, Dickey & Pierce, P.L.C.

(57) ABSTRACT

A disassembler module is configured to generate ARM code by performing a disassembly of a compiled iOS application. An intermediate representation generator module is configured to: (i) from the ARM code, identify an implementation of a predetermined method of providing a deep link into the iOS application; and (ii) generate intermediate representation code by formatting portions of the ARM code having predetermined patterns according to predetermined instructions, respectively. A loader module is configured to translate the intermediate representation code into executable code including objects in a tuple format and to load the executable code for execution. An execution and emulation module is configured to: (i) execute the executable code line by line to identify NSURL objects; (ii) emulate the NSURL objects to identify valid ones of the NSURL objects; (iii) determine deep links for the valid ones, of the NSURL objects, respectively; and (iv) store the deep links in memory.

20 Claims, 9 Drawing Sheets

Related U.S. Application Data

(60) Provisional application No. 62/204,959, filed on Aug. 13, 2015.

(56) References Cited

U.S. PATENT DOCUMENTS

| | | |
|---|---|---|
| 2009/0113402 A1 | 4/2009 | Chen et al. |
| 2013/0205415 A1 | 8/2013 | McKee et al. |
| 2014/0108373 A1* | 4/2014 | Abrahami ......... G06F 17/30864 707/706 |
| 2014/0189679 A1 | 7/2014 | Adams et al. |
| 2015/0156061 A1* | 6/2015 | Saxena ............... H04L 41/0803 715/733 |
| 2016/0189225 A1* | 6/2016 | Glover .............. G06F 17/30864 705/14.55 |

\* cited by examiner

| | | |
|---|---|---|
| MOV | R6, R0 | |
| MOV | R0, #(selRef_objectForKeyedSubscript_ - 0x142F60) | — 404 |
| MOVW | R2, #( : lower16: (cfstr_Listing_id – 0x142F66)) | |
| ADD | R0, PC ; selRef_objectForKeyedSubscript_ | |
| MOVT.W | R2, #( : upper16: (cfstr_Listing_id – 0x142F66)) | |
| ADD | R2, PC | |
| LDR | R1, [R0] | |
| MOV | R0, R6 | |
| BLX.W | _objc_msgSend | |
| MOV | R7, R7 | |
| BLX.W | _objc_retainAutoreleasedReturnValue | |
| MOV | R5, R0 | |
| MOV | R0, #(selRef_stringValue – 0x142F80) | |
| ADD | R0, PC ; selRef_stringValue | — 408 |
| LDR | R1, [R0] | |
| MOV | R0, R5 | |
| BLX.W | _objc_msgSend | |
| MOV | R7, R7 | |
| BLX.W | _objc_retainAutoreleasedReturnValue | |
| MOV | R8, R0 | |
| MOV | R0, R5 | |
| BLX.W | _objc_release | |
| MOV | R0, R6 | |
| BLX.W | _objc_release | |
| MOV | R0, #(selRef_length – 0x142FA6) | |
| ADD | R0, PC ; selRef_length | |
| LDR | R1, [R0] | — 412 |
| MOV | R0, R8 | |
| BLX.W | _objc_msgSend | |
| CMP | R0, #0 | — 416 |
| BEQ.W | loc_143124 | |
| MOVW | R0, #( : lower16: (classRef_NSURL – 0x142FD0)) | |
| MOV | R3, R8 | |
| MOVT.W | R0, #( : upper16: (classRef_NSURL – 0x142FD0)) | |

FIG. 4

404 → ('CALL',2,0,'None','v_0x142f68L','None','v_0x142f44L','objectForKeyedSubscript:',['listing_id'],'?')
408 → ('CALL',2,0,'None','v_0x142f82L','None','v_0x142f68L','stringValue',[],'?')
412 → ('CALL',2,0,'None','v_0x142fa8L','None','v_0x142f82L','length',[],'?')
416 → ('IF',2,0,'v_0x142fa8L','#0','9','3')

FIG. 5

('CALL',0,0,'NSString','v_0x9c58L','NSURL','ARG2','host',[],'?')
('CALL',0,0,'None','v_0x9c92L','NSString','v_0x9c58L','isEqualToString:',['/page'],'?')
('IF',0,0,'v_0x9c9aL','#0','13','1')
('CALL',1,0,'NSString','v_0x9cc8L','NSURL','ARG2','path',[],'?')
('CALL',1,0,'None','v_0x9d02L','NSString','v_0x9cc8L','isEqualToString:','v_0x9cc8L','isEqualToString:',['/main'],'?')
('IF',1,0,'v_0x9d0aL','#0','3','2')
('CALL',2,0,'None','v_0x9d38L','None','DLAppDelegate','mainController',[],'@8@0:4')

FIG. 6

```
('CALL','0',0,'None','v_0x142f02L','NSUserActivity','ARG2','activityType',[],'?')
('CALL','0',0,'None','v_0x142f1eL','None','EtsyHandoffHelper','typeForUserActivityString:',['v_0x142f02L'],'i12@0:4@8')
('CALL','0',1,'None','v_0x2ed576L','None','ARG1','isEqualToString:',['com.etsy.homepage_handoff'],'?')
('IF',0,1,'v_0x2ed576L','#0xFF','2','1')
('GOTO',1,1,5)
('CALL',2,1,'None','v_0x2ed592L','None','ARG1','isEqualToString:',['com.etsy.listing_handoff'],'?')
('IF',2,1,'v_0x2ed592L','#0xFF','4','3')
('GOTO',3,1,5)
('CALL',4,1,'None','v_0x2ed5aeL','None','ARG1','isEqualToString:',['com.etsy.purchases_handoff'],'?')
('IF',0,0,'3','#3','4','1')
('IF',1,0,'None','#2','5','2')
('CALL',2,0,'None','v_0x142f44L','NSUserActivity','ARG2','userInfo',[],'?')
('CALL',2,0,'None','v_0x142f68L','None','v_0x142f44L','objectForKeyedSubscript:',['listing_id'],'?')
('CALL',2,0,'None','v_0x142f82L','None','v_0x142f68L','stringValue',[],'?')
('CALL',2,0,'None','v_0x142fa8L','None','v_0x142f82L','length',[],'?')
('IF',2,0,'v_0x142fa8L','#0','9','3')
('CALL',3,0,'NSString','v_0x142fe2L','None','NSString','stringWithFormat:',['etsy://listing/%@', 'v_0x142f82L'],'?')
('CALL',3,0,'NSURL','v_0x142ffeL','None','NSURL','URLWithString:',['v_0x142fe2L'],'?')
('CALL',3,0,'None','v_0x143028L','None','UIApplication','sharedApplication',[],'?')
('CALL',3,0,'None','v_0x143044L','None','v_0x143028L','openURL:',['v_0x142ffeL'],'?')
('GOTO',3,0,10)
('CALL',4,0,'NSURL','v_0x14307aL','None','NSURL','URLWithString:',['etsy://purchases'],'?')
('CALL',4,0,'None','v_0x14309eL','None','UIApplication','sharedApplication',[],'?')
('GOTO',4,0,7)
('IF',5,0,'None','#1','8','6')
('CALL',6,0,'NSURL','v_0x1430ccL','None','NSURL','URLWithString:',['etsy://home'],'?')
('CALL',6,0,'None','v_0x1430f0L','None','UIApplication','sharedApplication',[],'?')
('GOTO',6,0,7)
('CALL',7,0,'None','v_0x14310cL','None','v_0x1430f0L','openURL:','v_0x1430ccL'],'?')
('GOTO',7,0,11)
('GOTO',8,0,11)
('GOTO',9,0,10)
('GOTO',10,0,11)
```

FIG. 7

('CALL',0,0,'None','v_0x1e1080L','NSUserActivity','ARG2','activityType',[],'?')
('CALL',0,0,'None','v_0x1e10a6L','None','v_0x1e1080L','isEqualToString:',['com.foursquare.batman.venue'],'?')

FIG. 8

4: ('CALL',3,0,'None','v_0x1e1120aL','None','v_0x1e11d4L','openURL:','[v_0x1e11eeL]','?')
5: ('GOTO',3,0,25)
⋮
21: ('GOTO',25,0,26)
22: ('CALL',27,0,'None','v_0x1e1832L','NSUserActivity','ARG2','activityType',[],'?')
⋮

FIG. 9

('CALL',0,0,'NSString','v_0x9c58L','NSURL','ARG2','host',[],'?')
('CALL',0,0,'None','v_0x9c92L','NSString','v_0x9c58L','isEqualToString:','[/page]','?')
('IF',0,0,'v_0x9c9aL','#0','13','1')
('CALL',1,0,'NSString','v_0x9cc8L','NSURL','ARG2','path',[],'?')
('CALL',1,0,'None','v_0x9d02L','NSString','v_0x9cc8L','isEqualToString:','[/main]','?')
('IF',1,0,'v_0x9d0aL','#0','3','2')
('CALL',2,0,'None','v_0x9d38L','None','DLAppDelegate','mainController',[],'@8@0:4')

FIG. 10

```
('CALL',0,0,'None','v_0x142f02L','NSUserActivity','ARG2','activityType',[],'?')
('CALL',0,0,'None','v_0x142f1eL','None','EtsyHandoffHelper','typeForUserActivityString:',['v_0x142f02L'],'i12@0:4@8')
('CALL',0,1,'None','v_0x2ed576L','None','ARG1','isEqualToString:',['com.etsy.homepage_handoff'],'?')
('IF',0,1,'v_0x2ed576L','#0xFF','2','1')
('GOTO',1,1,5)
('CALL',2,1,'None','v_0x2ed592L','None','ARG1','isEqualToString:',['com.etsy.listing_handoff'],'?')
('IF',2,1,'v_0x2ed592L','#0xFF','4','3')
('GOTO',3,1,5)
('CALL',4,1,'None','v_0x2ed5aeL','None','ARG1','isEqualToString:',['com.etsy.purchases_handoff'],'?')
('IF',0,0,'3','#3','4','1')
('IF',1,0,'None','#2','5','2')
('CALL',2,0,'None','v_0x142f44L','NSUserActivity','ARG2','userInfo',[],'?')
('CALL',2,0,'None','v_0x142f68L','None','v_0x142f44L','objectForKeyedSubscript:',['listing_id'],'?')
('CALL',2,0,'None','v_0x142f82L','None','v_0x142f68L','stringValue',[],'?')
('CALL',2,0,'None','v_0x142fa8L','None','v_0x142f82L','length',[],'?')
('IF',2,0,'v_0x142fa8L','#0','9','3')
('CALL',3,0,'NSString','v_0x142fe2L','None','NSString','stringWithFormat:',['etsy://listing/%@', 'v_0x142f82L'],'?')
('CALL',3,0,'NSURL','v_0x142ffeL','None','NSURL','URLWithString:',['v_0x142fe2L'],'?')
('CALL',3,0,'None','v_0x143028L','None','UIApplication','sharedApplication',[],'?')
('CALL',3,0,'None','v_0x143044L','None','v_0x143028L','openURL:',['v_0x142ffeL'],'?')
('GOTO',3,0,10)
('CALL',4,0,'NSURL','v_0x14307aL','None','NSURL','URLWithString:',['etsy://purchases'],'?')
('CALL',4,0,'None','v_0x14309eL','None','UIApplication','sharedApplication',[],'?')
('GOTO',4,0,7)
('IF',5,0,'None','#1','8','6')
('CALL',6,0,'NSURL','v_0x1430ccL','None','NSURL','URLWithString:',['etsy://home'],'?')
('CALL',6,0,'None','v_0x1430f0L','None','UIApplication','sharedApplication',[],'?')
('CALL',7,0,'None','v_0x14310cL','None','v_0x1430f0L','openURL:','v_0x1430ccL'],'?')
('GOTO',7,0,11)
('GOTO',8,0,11)
('GOTO',9,0,10)
('GOTO',10,0,11)
```

FIG. 11

STATIC ANALYSIS AND RECONSTRUCTION OF DEEP LINK HANDLING IN COMPILED APPLICATIONS

CROSS-REFERENCE TO RELATED APPLICATIONS

The present application is a continuation of U.S. patent application Ser. No. 14/984,642, filed Dec. 30, 2015, which claims the benefit of U.S. Provisional Application No. 62/204,959, filed on Aug. 13, 2015. The entire disclosures of the applications referenced above are incorporated by reference.

FIELD

The present application relates generally to computer programming and more particularly to systems and methods for identifying deep links within a compiled iOS application.

BACKGROUND

As the popularity of mobile devices continues to grow, software developers have flooded the market with thousands of application programs (apps) for mobile devices. Today, these mobile apps provide functionality ranging from general purpose productivity and information retrieval, including email, calendar, contacts, stock market and weather information, to special purpose applications, including medical and health monitoring, social media, air travel monitoring, taxi rental, restaurant ranking, etc.

In HyperText Markup Language (HTML) based web applications, each state of an application can be discovered by a web crawler. Unlike HTML based web applications, many mobile apps have deep states that are not exposed (and therefore not discoverable by a web crawler) but are designed into the app so that external processes can reach those deep states. For example, an app that ranks restaurants based on social media input may have several different and diverse navigation paths that a user may follow. The user may select a "restaurant" category and then filter the selection to display those that offer home delivery. From there, the user may select a particular restaurant that is "most popular" and within a predefined price range. The user may next select a particular restaurant from the filtered selection list. This will take the user to a web page describing the particular restaurant including pictures, location map, and other patron reviews.

The web page describing the particular restaurant selected corresponds to a deep state within the app. While the user could navigate to the deep state by making the series of navigation choices described above, an external computer process or another app running will typically not be able to reach these deep states unless the developer of the app programmed (coded) the app to have the ability to reach that deep state.

Programming an app to include deep states that are accessible by other external computer processes and other apps can be technically challenging and is time consuming. Most apps that are available to the public do not have exposed (publicly available) deep links by which deep states programmed into the app may be accessed.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In a feature, a computer system is described. A disassembler module is configured to generate Acorn RISC (reduced instruction set computing) Machine (ARM) code by performing a disassembly of binary code of a compiled iOS application. An intermediate representation generator module is configured to: (i) from the ARM code, identify an implementation of a predetermined method of providing a deep link into the iOS application; and (ii) generate intermediate representation code by formatting portions of the ARM code having predetermined patterns according to predetermined instructions associated with the predetermined patterns, respectively. A loader module is configured to translate the intermediate representation code into executable code including objects in a tuple format and to load the executable code for execution. An execution and emulation module is configured to: (i) execute the executable code line by line to identify NSURL objects; (ii) emulate the NSURL objects to identify valid ones of the NSURL objects; (iii) determine deep links for the valid ones, of the NSURL objects, respectively; and (iv) store the deep links in memory.

In further features, the intermediate representation generator module is configured to identify the implementation of the predetermined method of providing a deep link from a predetermined portion of the ARM code.

In still further features, the intermediate representation generator module is configured to identify the implementation of the predetermined method of providing a deep link by verifying that a name of a method included in a predetermined portion of the ARM code is the same as a name of the predetermined method.

In yet further features, the disassembler module is configured to generate the ARM code by performing the disassembly using the Interactive DisAssembler (IDA) from Hex-Rays.

In further features, by performing the disassembly, the disassembler module is configured to generate one of: 32 bit ARM code; and 64 bit ARM code.

In still further features, the predetermined method of providing a deep link includes one of: (i) application: openURL:sourceApplication:annotation; and (ii) handle OpenURL:sourceApplication:annotation.

In yet further features, the loader module is configured to translate the intermediate representation code into executable code including objects in a tuple format.

In further features, the predetermined instructions include CALL functions, conditional IF instructions, and unconditional GOTO instructions.

In still further features, the execution and emulation module is configured to determine that one of the NSURL objects is valid when a condition of the one of the NSURL objects is satisfied.

In yet further features a system includes the computer system and a search system. The search system is configured to provide a plurality of search results to a user iOS device in response to a search query. At least one of the plurality of search results includes data about a deep state of the iOS application and a deep link corresponding to the deep state of the iOS application.

In a feature, a tangible computer readable medium comprising code is described. When executed by a processor, the code: generates Acorn RISC (reduced instruction set computing) Machine (ARM) code by performing a disassembly of binary code of a compiled iOS application; from the ARM code, identifies an implementation of a predetermined method of providing a deep link into the iOS application; generates intermediate representation code by formatting portions of the ARM code having predetermined patterns according to predetermined instructions associated with the predetermined patterns, respectively; translates the intermediate representation code into executable code including objects in a tuple format; loads the executable code for execution; executes the executable code line by line to identify NSURL objects; emulates the NSURL objects to identify valid ones of the NSURL objects; determines deep links for the valid ones, of the NSURL objects, respectively; and stores the deep links.

In further features, when executed, the code identifies the implementation of the predetermined method of providing a deep link from a predetermined portion of the ARM code.

In still further features, when executed, the code identifies the implementation of the predetermined method of providing a deep link by verifying that a name of a method included in a predetermined portion of the ARM code is the same as a name of the predetermined method.

In yet further features, when executed, the code generates the ARM code by performing the disassembly using the Interactive DisAssembler (IDA) from Hex-Rays.

In further features, when executed, the code generates one of (i) 32 bit ARM code and (ii) 64 bit ARM code by performing the disassembly.

In still further features, the predetermined method of providing a deep link includes one of: (i) application:openURL:sourceApplication:annotation; and (ii) handle OpenURL:sourceApplication:annotation.

In yet further features, when executed, the code translates the intermediate representation code into executable code including objects in a tuple format.

In further features, the predetermined instructions include CALL functions, conditional IF instructions, and unconditional GOTO instructions.

In still further features, when executed, the code determines that one of the NSURL objects is valid when a condition of the one of the NSURL objects is satisfied.

In yet further features, a system includes the tangible computer readable medium and a search system. The search system is configured to provide a plurality of search results to a user iOS device in response to a search query. At least one of the plurality of search results includes data about a deep state of the iOS application and a deep link corresponding to the deep state of the iOS application.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4 includes an example portion of machine code for an instance of one predetermined method that a developer may implement to provide a deep link into an app.

FIG. 5 includes an example intermediate representation for the example machine code of FIG. 4.

FIGS. 6 and 7 include examples of intermediate representations of machine code for an app.

FIG. 8 includes an example instruction array constructed using Python tuple objects.

FIG. 9 includes an example instruction array constructed using Python tuple objects to illustrate the functionality of a GOTO instruction handler.

FIGS. 10 and 11 include other examples of intermediate representations for apps, respectively.

In the drawings, reference numbers may be reused to identify similar and/or identical elements.

DETAILED DESCRIPTION iOS generally refers to the operating system (OS) of Apple mobile devices, such as iPhones, iPads, iWatches, iPods, and other mobile devices (iOS devices) of Apple, Inc. Applications (apps) for iOS devices can be referred to as iOS apps. iOS apps are originally coded by app developers, for example, using Objective-C programming language. iOS apps are compiled and compiled versions iOS apps can be downloaded from Apple's App Store.

A deep link computer system operates on a compiled iOS app, such as a binary form of the iOS app. The iOS app includes a number of executable functions defined to have meaning within the OS and processor environment in which the iOS app is executed. The deep link computer system identifies functions associated with deep links corresponding to deep states within the iOS app.

The deep link computer system executes a disassembly process on the compiled iOS app. The deep link computer system identifies, within the disassembled code, a set of basic building block functions can be used to describe the basic logic flow topology of the iOS app. More specifically, the deep link computer system identifies relevant portions of the disassembled code and groups the relevant portions of the disassembled code instructions into sets of basic building block functions including: IF, CALL, and GOTO functions. The deep link computer system writes the functions in a predetermined format, such as a tuple structure, to prepare one or more intermediate representations for the iOS app.

The goal is not to completely reverse engineer all aspects of the iOS app. The goal is instead to extract the logic that is responsible for defining the deep states and the deep links that are used to navigate to the respective deep states within the iOS app. Thus, portions of the disassembled code that are unrelated (and not relevant) to this navigation, such as memory management, do not need to be analyzed by the deep link computer system.

From the intermediate representation(s), the deep link computer system identifies deep link(s) (e.g., uniform resource locators (URLs)) for the iOS app. The deep links can be used by external processes and other iOS apps to launch and access the deep states within the analyzed iOS app. While the present application will describe the example of an iOS app, the present application is also applicable to identifying deep links for deep states of apps of the Android OS and apps for other types of operating systems. Deep links in apps for other types of operating systems may be determined in the same or similar ways.

Figure 1:
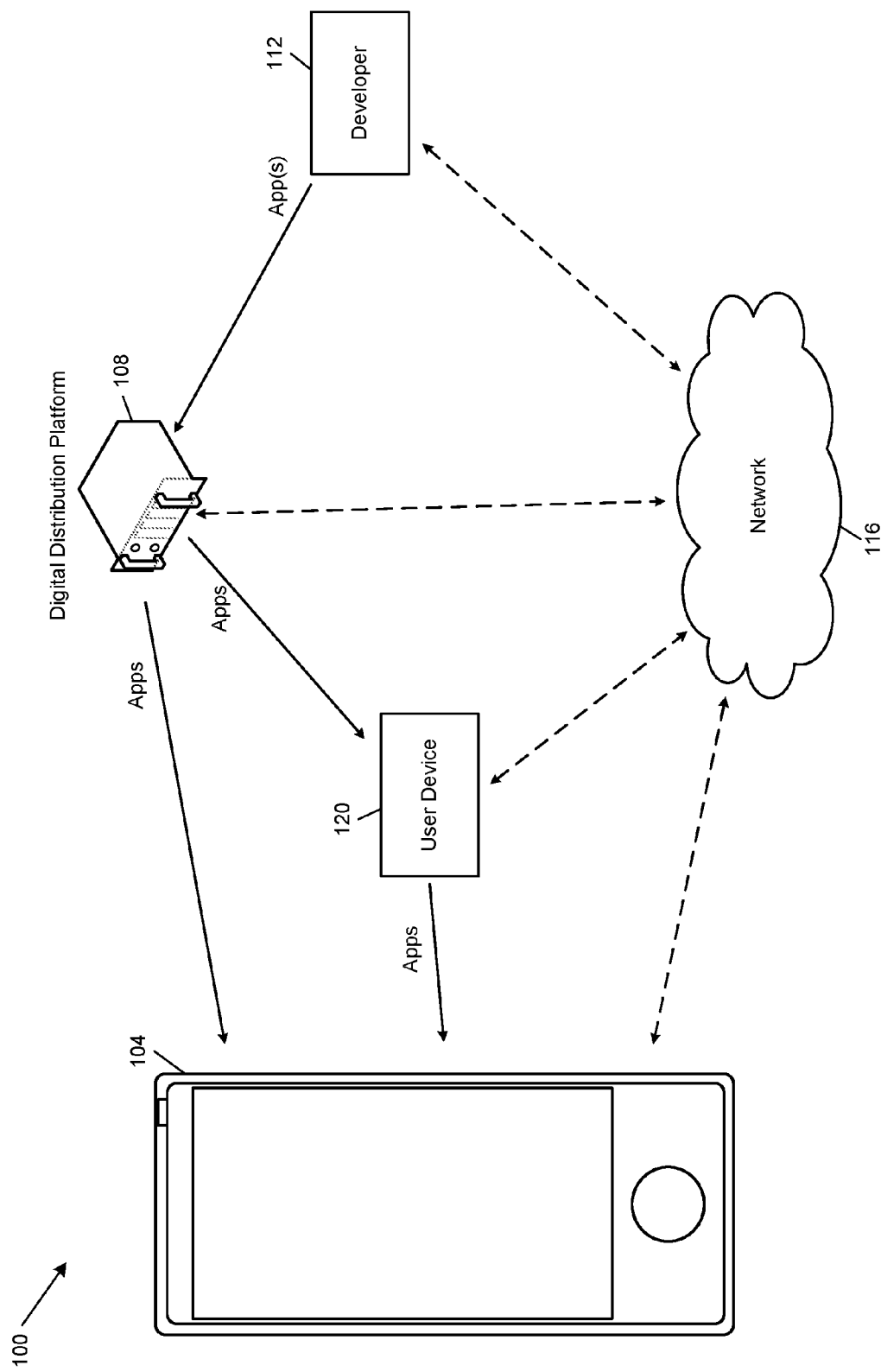
FIG. 1 is a functional block diagram of an example application distribution system.

FIG. 1 is a functional block diagram of an example application distribution system 100. A user device 104 is depicted as a smart phone, but could be another type of user device utilizing iOS, such as a laptop, tablet, smartwatch, or wearable device. As stated above, the present application will be discussed using the example of iOS apps, but the present application is also applicable to identifying deep links for deep states of apps of the Android operating system and apps for other types of operating systems.

The user device 104 may have a plurality of iOS apps pre-installed (e.g., by the manufacturer) in memory of the user device 104, such as a Safari (internet browser) app, a mail app, a weather app, a stocks app, a messaging app, etc. The user device 104 can also download iOS apps from a digital distribution platform 108.

Developers, such as developer 112, develop iOS apps using a programming language, such as Objective-C. Developers compile iOS apps and provide compiled (e.g., binary) versions of the iOS apps to the digital distribution platform 108. Developers may develop an iOS app to include deep links for accessing deep states, respectively, within the iOS app. The deep links, however, are not easily identifiable from a compiled iOS app, and developers often do not disclose what the deep links are that are included in an iOS app.

The digital distribution platform 108 distributes compiled iOS apps to the user device 104 and other user devices 104. Examples of digital distribution platforms include the APP STORE digital distribution platform from Apple, Inc., and the GOOGLE PLAY distribution platform from Google, Inc.

While the data flow in FIG. 1 is shown with solid lines, the systems in FIG. 1 may actually communicate with each other via network 116. Dashed lines are provided to illustrate network communication. The network 116 may include wired and wireless local area networks, personal area networks, cellular data networks, and wide area networks such as the Internet. The user device 104 may download compiled iOS apps from the digital distribution platform 108 via the network 116.

The user device 104 may also interface an application executed by a second user device 120 to synchronize data and/or iOS applications stored in the user device 104 with data and iOS applications stored in the second user device 120. The second user device 120 may be, for example, a desktop computer, a laptop computer, or another type of user device. By synchronizing, iOS applications can be downloaded by the user device 104 and transferred to and stored in the second user device 120. iOS applications can also be downloaded by the second user device 120 and can be transferred to and stored in the user device 104.

Figure 2:
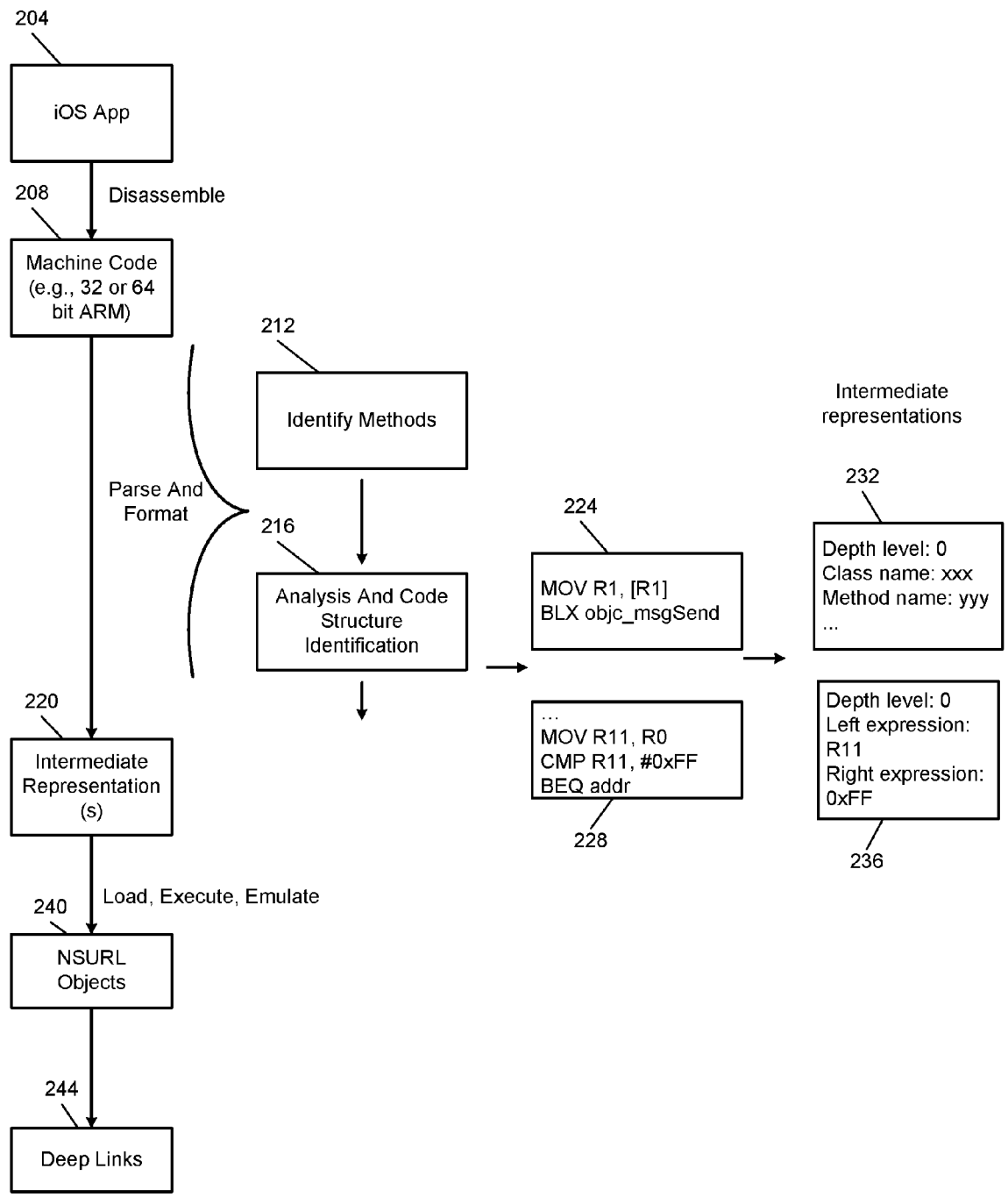
FIG. 2 is a flowchart depicting an example method of reconstructing deep links within a compiled app.
Figure 3:
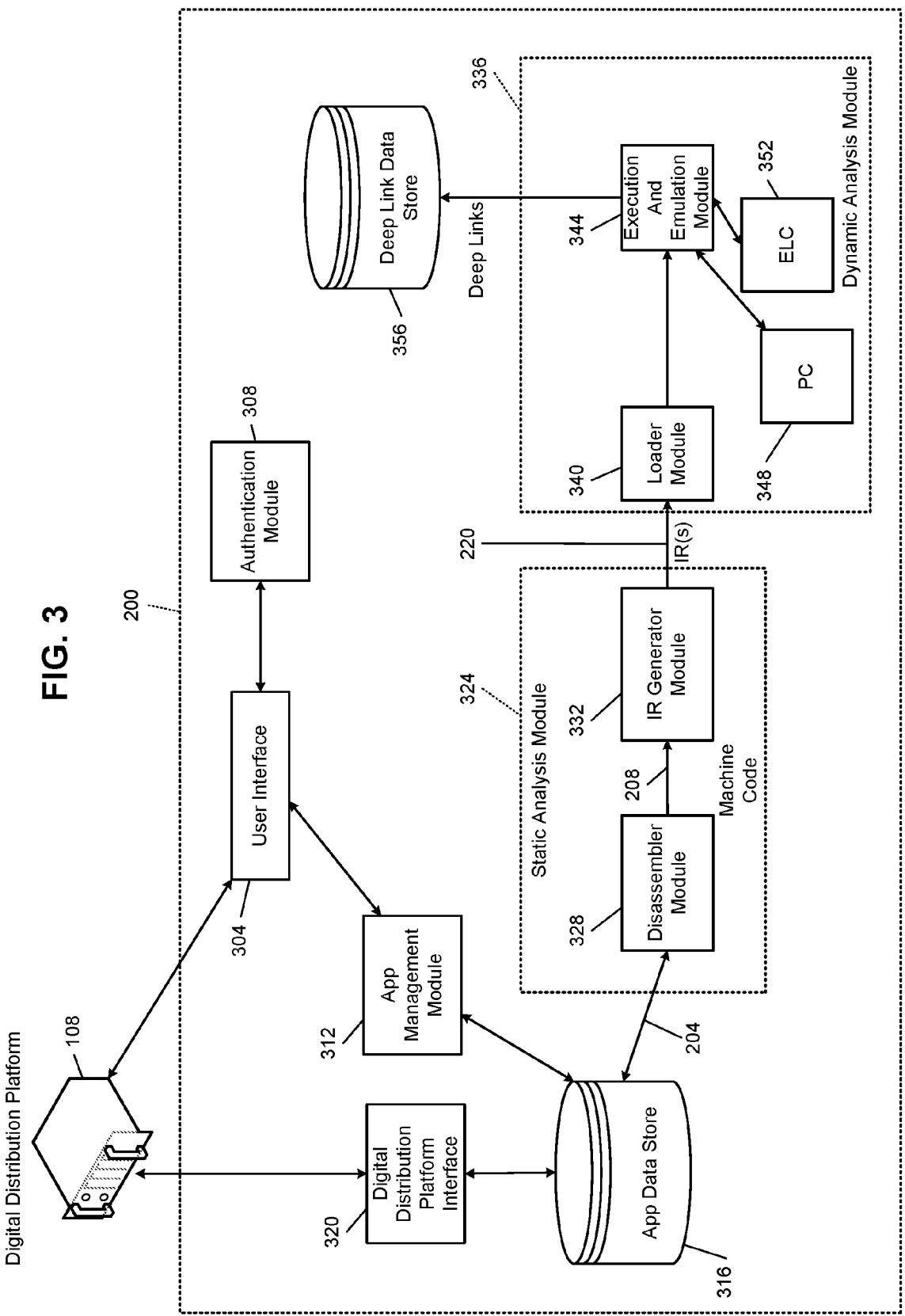
FIG. 3 is a hardware diagram of a computer system for reconstructing deep links within a compiled app.

FIG. 2 is a flowchart illustrating an example method of obtaining deep links within an iOS application. FIG. 3 is a functional block diagram of an example computer system 200 that identifies deep links within an iOS application.

Referring to FIGS. 2 and 3, a compiled iOS application 204 (FIG. 2) is obtained by the computer system. The iOS application 204 may be represented by binary code. The computer system may provide a user interface 304 (FIG. 3), such as a web page. A user may access the user interface 304 and authenticate credentials with the digital distribution platform 108 based on a developer authentication module 308 (FIG. 3). The developer authentication module 308 may store credentials for the user and verify that another entity is not posing as the user. Credentials may be stored according to best practices, such as by adding a cryptographic salt value to the credentials and using a strong hashing function, such as PBKDF2 (Password-Based Key Derivation Function 2).

Via the user interface 304, the user selects an iOS app to be downloaded from the digital distribution platform 108. In various implementations, selection of iOS apps may be automated such that multiple or all available iOS apps can be analyzed for deep links. In this example, the iOS app 204 is selected and downloaded.

An app management module 312 (FIG. 3) may create a new record in an app data store 316 when the user selects the iOS app 204. The iOS app 204 may be identified by a link (e.g., a URL (Uniform Resource Locator)) to a digital distribution platform.

Based on the link, a digital distribution platform interface 320 (FIG. 3) may contact the corresponding digital distribution platform and download the iOS app 204. The digital distribution platform interface 320 stores the iOS app 204 in the app data store 316. The digital distribution platform interface 320 may also acquire data related to the iOS app 204. For example, this data may include hidden metadata as well as the data available to regular users of the digital distribution platform. For example, the following data may be obtained and then stored in the app data store 316: name of the app, name of the app developer, text reviews, numeric rating, version history, download count, supported OS versions, etc. As an alternative to obtaining the iOS app 204 from a digital distribution platform, the iOS app 204 may be obtained from the developer of the iOS app 204 or from a user device that downloaded the iOS app 204 from the digital distribution platform.

As stated above, the iOS app 204 is obtained in a compiled form, such as in binary code. A static analysis module 324 (FIG. 3) performs static analysis on the iOS app 204 to acquire knowledge about the logic flow topology of the iOS app 204. More specifically, a disassembler module 328 (FIG. 3) executes a disassembler on the iOS app 204. An example disassembler is the IDA (Interactive DisAssembler) disassembler from Hex-Rays (see hex-rays.com).

Execution of the disassembler on the iOS app 204 produces machine code 208 (FIG. 2) corresponding to the iOS app 204. The machine code 208 may also be referred to as assembly code. The machine code 208 may be, for example, 32 or 64 bit ARM (Acorn RISC (reduced instruction set computing) Machine) code executable by ARM processors. iOS devices may include one or more ARM processors.

An intermediate representation (IR) generator module 332 (FIG. 3) parses (or crawls) the machine code 208 to identify all instances of a deep link. In the iOS environment, to give other iOS apps and external processes the ability to deep link into an iOS app, deep link handling must be implemented using one of a plurality of predetermined methods (also called implementations) defined by Apple. Examples of the predetermined methods identified by Apple include, but are not limited to:

application:openURL:sourceApplication:annotation; and handle OpenURL:sourceApplication:annotation.

The above examples are provided in Objective-C notation. One or more other methods may be possible for iOS 9 and later versions of iOS.

The IR generator module 332 first analyzes the machine code 208 to identify instances in the machine code 208 where the predetermined methods were used. This is illustrated by 212 in FIG. 2.

In the iOS app 204, the NSUserDefaults class provides a programmatic interface for interacting with the defaults system. The defaults system allows an iOS app to customize its behavior to match a user's preferences. NSURL instances may be used to reference files within a process. Having knowledge of how and where the predetermined methods occur within the iOS app 204 provides information about the iOS app 204's logic flow topology. A NSURL instance stores a URL, and deep links within an app are equivalent to URLs.

The IR generator module 332 parses one or more sections of the iOS app 204 to obtain the names of all of the methods used and identifies locations where the predetermined methods are used. By way of example only, in the example of using the IDA disassembler, the IR generator module 332 begins by parsing a predetermined portion (e.g., a methname section within an _OBJC segment) of the machine code 208. For each method name in the methname section, the IR generator module 332 performs the following functions:

(1) If the method name is not one of the predetermined method names (e.g., the "continueUserActivity" method), skip to the next method name and return to (1).

(2) If the method name is one of the predetermined method names, find a reference (e.g., a pointer) to that predetermined method name in the const section of the machine code 208. Continue to (3).

(3). Use the reference (e.g., pointer) as an address into the machine code 208 that identifies the following structure (this structure describes the method's properties):
struct old_method {
SEL method_name;
char *method_types;
IMP method_imp;
}. Continue with (4)

(4). Examine the method_imp member within the identified structure:

4a. If the method_imp member is not a NULL value, save the value in memory. This value represents the address where the method is implemented in the machine code 208.

4b. If the method_imp member is not a NULL value, add the value of method_imp to a list containing all methods.

Stated more generally relative to the above example that is applicable to use of the IDA disassembler, the IR generator module 332 identifies locations (addresses) where any one of the predetermined methods is used in the iOS app 204.

The IR generator module 332 analyzes the portions of the machine code 208 where the predetermined methods were used. The IR generator module 332 does so to identify particular logic flow features within the machine code 208 from which the logic flow topology of the iOS app 204 can be discerned. The analysis and code structure identification functions described above are illustrated by 216 in FIG. 2. The IR generator module 332 generates one intermediate representation 220 for each instance of use of one of the predetermined methods.

To generate an intermediate representation, the IR generator module 332 maps portions of the machine code 208 for that instance of one of the predetermined methods onto a set of predetermined block functions. The IR generator module 332 maps patterns of code in the machine code 208 onto the following block functions:

CALL—invocations of an Objective-C (or Swift) method. Calls to Objective-C (or Swift) methods are identified by looking for branch instructions with the destination leading to the objc_msgSend function.

IF—encountered conditional statements. Conditions are identified by looking at the suffix of the binary instructions (e.g., ARM binary instructions) and identifying flag changing instructions, such as CMP or TST.

GOTO—an unconditional branch (e.g., a B instruction).

The IR generator module 332 parses and analyzes the machine code 208 to identify patterns in the machine code 208 that are used to associate a particular section of the machine code 208 with one of the predetermined block functions. While the examples of CALL, IF, and GOTO functions are provided, one or more other block functions may additionally or alternatively be used.

FIG. 4 includes an example portion of machine code for an instance of one of the predetermined methods. In FIG. 4, portions 404, 408, and 412 include patterns for first, second, and third CALL functions, respectively. Portion 416 includes a pattern for an IF function. The intermediate representation generator 332 identifies patterns for the CALL, IF and GOTO functions and stores the following information for each. An example CALL function is illustrated by 224 in FIG. 2. An example IF function is illustrated by 228 in FIG. 2.

For each identified CALL function, the IR generator module 332 stores the following in the intermediate representation:

Address: the address in the machine code 208 of where objc_msgSend was invoked from;

Depth Level: the hierarchical number of the call (e.g., if A calls B, then A has Depth Level of 0 and B has depth level of 1, etc.);

Class name: the name of the class that implements the method;

Method name: the name of the method;

Encoded args: encoded argument types (for example, as defined by Apple);

Arguments: the arguments to the method;

Return type: the return type (e.g. int, NSString, . . . ) of the method;

Class Type: the type of the class when a method is called of a class that was created dynamically; and Basic Block: the basic block ID to which the method belongs.

For each identified IF function, the IR generator module 332 stores the following in the intermediate representation:

Depth Level: the hierarchical order of the call;

Basic Block: the basic block ID to which the method belongs;

Left expression: the expression on the left side of the condition;

Right expression: the expression on the right side of the condition;

True Basic Block: which basic block number to go to if the condition is evaluated to Boolean TRUE; and False Basic Block: which basic block number to go to if the condition is evaluated to Boolean FALSE.

For each identified GOTO function, the IR generator module 332 stores the following in the intermediate representation:

Depth Level: the hierarchical order of the call;

Basic Block: the basic block ID to which the method belongs; and

Destination block: the basic block to be executed following the branch instruction.

As defined by the processor architecture and processor machine code instruction set, a predefined set of parameters will typically be defined. Processors based on the ARM architecture employ a plurality of registers, identified as R0, R1, R2, . . . . These registers have specific functions as defined by the processor machine code instruction set. The IR generator module 332 utilizes the register values when mapping the machine code 208 onto the predetermined block functions.

For example, for each CALL function, the IR generator module 332 identifies the name of the method to be invoked and its class based on the values of the R0 and R1 (in 32 bit ARM) registers. The values in the R0 and R1 registers represent the first and second arguments, respectively, in ARM calling conventions. The first argument to objc_msgSend is the class, and the second argument is the method name. A slicing algorithm, such as a backward slicing algorithm, is used to backtrace the value of those registers.

For each CALL function, the IR generator module 332 identifies the number of arguments the method has and resolves their values. For example only, the IR generator module 332 may determine the number of arguments the method has by counting the number of colons (:) in the method name. In Objective-C, each colon represents one argument. AS another example only, the IR generator module 332 may determine the number of arguments the method has via Apple's parameter encoding to understand the number of parameters. The arguments' values may be resolved, for example, using a slicing algorithm, such as a backward slicing algorithm, or in another suitable manner.

For each CALL function, the IR generator module 332 also creates a variable name. The variable name holds the return value of the method, in order to maintain the execution flow. Variable names are created by concatenating the prefix 'v_0x' and the address in the machine code 208 where the method is called from.

For each CALL function, the IR generator module 332 also identifies initialization and singleton methods in order to support dynamic object creation. Some of the core libraries in iOS are supported in order to correctly resolve the return type of such methods (e.g., NSURL path).

For each IF function, the IR generator module 332 identifies the left and right expressions of the condition. The IR generator module 332 also identifies the basic blocks for when the condition is evaluated as FALSE and TRUE.

If an implemented method invokes one or more other methods, the other method(s) may also be processed, as described above, and represented within the (first level) method's intermediate representation. If one of the other methods also invokes one or more methods, these one or more other methods may also be processed as described above. This may continue until a predetermined method depth level has been achieved. For example only, the predetermined method depth level may be between 3 and 9, inclusive, although less than depth levels of less than 3 or greater than 9 may be used.

An example portion of an intermediate representation for the example CALL function 224 is illustrated by 232 in FIG. 2. An example portion of an intermediate representation for the example IF function 228 is illustrated by 236 in FIG. 2.

The IR generator module 332 may generate two intermediate representations 220 for each implemented predetermined method in various implementations. One of the two intermediate representations 220 may be a human readable version having code written in, for example, Objective-C language. The other one of the two intermediate representations is a machine (computer) readable version. The machine readable version is formatted, for example, using a tuple object structure (a tuple format) where each CALL, IF, and GOTO function (and the associated parameters) is stored on a separate line and is constructed using tuple objects.

FIG. 5 includes an example of the machine readable intermediate representation for the example machine code of FIG. 4. FIGS. 6 and 7 include examples of machine readable intermediate representations of examples of machine code for other iOS apps.

A dynamic analysis module 336 (FIG. 3) loads the intermediate representation(s) 220 and executes the intermediate representation(s) 220, line by line. The dynamic analysis module 336 may also translate the intermediate representation(s) 220 into tuple objects if the intermediate representation(s) 220 is/are not already in a predetermined format. The dynamic analysis module 336 generates emulates portions of the native Objective-C code of the iOS app 204, identifies NSURL objects 240 (FIG. 2), and identifies valid ones of the NSURL objects 240 to determine deep links 244 (FIG. 2) of the iOS app 204.

Written another way, the dynamic analysis module 336 performs symbolic execution of the intermediate representation(s) 220. The dynamic analysis module 336 functions as an equation solver, where the individual block functions of the intermediate representation(s) 220 provide the input objective functions and constraints for the equation solving.

In the context of a mathematical equation solver, an equation solver outputs a numerical answer. In the case of the dynamic analysis module 336, the dynamic analysis module 336 outputs deep links (e.g., URLs or universal resource identifiers (URIs) that satisfy the conditions represented by the intermediate representation(s) 220. In other words, the dynamic analysis module 336 finds which NSURL objects are valid, based on the provided intermediate representation(s) 220. The valid NSURL objects are of interest because they store representations of URLs (or URIs) which correspond to the deep links of the iOS app 204.

A solver takes as input a problem description, stated in a formalized manner (e.g., stated as a set of declarative statements or rules that serve as input constraints). The solver then calculates a solution that respects all of the input constraints. In the context of the present application, the individual lines of the intermediate representation(s) define the input problem. The solver calculates upon the input problem to determine what NSURL objects are present and valid in the intermediate representation(s) 220.

As illustrated in FIG. 3, a loader module 340 loads the intermediate representation(s) 220 and may translate the intermediate representation(s) 220 into tuple objects. Each line from the intermediate representation(s) 220 is treated as a single instruction that is executable by an execution and emulation module 344. The instructions are stored, for example, as an array or a matrix, which represents the formal statement of input constraints that the solver solves. An example format of the tuple objects for each type of block function is provided below. CALL:

('CALL'
  Basic Block Number, ⇒ the basic block number in which the function is invoked
  Depth Level, ⇒ the hierarchical order
  Return Value Type, ⇒ the return type of the method
  Return Value Variable, ⇒ the name of the variable that holds the return value
  Class Type, ⇒ class type
  Class Name, ⇒ class name
  Method name, ⇒ method name
  Arguments, ⇒ arguments to the method
  Argument Types, ⇒ argument types (encoded)
)
IF:
('IF',
  Basic Block Number, ⇒ the basic block number in which the function is invoked
  Depth Level, ⇒ the hierarchical order Left Expression, ⇒ left expression of condition
Right Expression, ⇒ right expression of condition
True Block Number, ⇒ basic block number to be executed if condition is Boolean TRUE
False Block Number, ⇒ basic block number to be executed if condition is Boolean FALSE
)
GOTO:
('GOTO',
Basic Block Number, ⇒ the basic block number in which the function is invoked
Depth Level, ⇒ the hierarchical order
Basic Block Number. ⇒ Basic block number to execute next
)

Once all of the instructions are loaded, the execution and emulation module 344 executes the instructions, line by line. The execution and emulation module 344 understands the type of instruction (CALL, IF, GOTO) and invokes the appropriate handler for each instruction.

For example, the execution and emulation module 344 invokes a CALL instruction handler for CALL instructions, etc. Each of the instruction handlers is responsible to complete the execution of a given instruction. Completion of execution of an instruction can include the null case where nothing is done and the process just iteratively moves on to the next instruction.

To mark the execution flow, the execution and emulation module 344 utilizes two counters, a program counter (PC) 348 and an execution level counter (ELC) 352. The PC 348 tracks the index into the instructions array, which indicates the instruction line that is currently being executed. The ELC 352 tracks the execution level, which corresponds to the depth level in the intermediate representation case. The execution and emulation module 344 updates the PC 348 and the ELC 352 as the instructions are executed.

FIG. 8 includes an example instruction array constructed using tuple objects. Referring to FIGS. 3 and 8, when the execution and emulation module 344 begins executing the instruction array of FIG. 8, both the PC 348 and the ELC 352 will be zero (i.e., PC=0 and ELC=0). The instruction referenced by PC=0 is a CALL instruction. The execution and emulation module 344 therefore involves the CALL instruction handler. Once the instruction (of PC=0) is executed, the execution and emulation module 344 increments the PC 348 (so PC=1). The ELC 352 is still 0 since depth level did not change in this example. The instruction referenced by PC=1 is a CALL instruction, so the execution and emulation module 344 invokes the CALL instruction handler. Once the execution and emulation module 344 has executed every line of the array, execution may end.

Regarding the instruction handlers, the CALL instruction handler will be dependent upon the functionality of the execution and emulation module 344. The GOTO instruction handler takes the destination block id from an instruction, finds the associated PC value, and sets the PC 348 to that value.

FIG. 9 includes an example instruction array constructed using tuple objects to illustrate the functionality of the GOTO instruction handler. In view of the array of FIG. 9, the GOTO instruction handler will handle the instruction ('GOTO',3,0,25) as follows:

(1) The destination block id is 25
(2) The associated PC value with block id 25 is 21
(3) Set the PC 348 to 21

The IF instruction handler reads the left and right expressions of an IF instruction and performs a logic function on the left and right expressions. For example, the IF handler may perform a logic AND on the left and right instructions, although another logic function may be used, such as a logic OR function, a logic exclusive OR (OR) function, or a not AND function (NAND). Based on the result of the logic function, the IF instruction handler sets the PC 348 either to the PC value associated with the TRUE block of the IF instruction or to the PC value associated with the FALSE block of the IF instruction.

More specifically, the IF instruction handler sets the PC 348 to the PC value associated with the TRUE block of the IF instruction if the result of the logic function is TRUE. For example, in the example of using a logic AND function, the IF instruction handler sets the PC 348 to the PC value associated with the TRUE block of the IF instruction if the left and right instructions are equal/equivalent. The IF instruction handler sets the PC 348 to the PC value associated with the FALSE block of the IF instruction if the result of the logic function is FALSE. For example, in the example of using a logic AND function, the IF instruction handler sets the PC 348 to the PC value associated with the FALSE block of the IF instruction if the left and right instructions are not equal/equivalent.

As an example, consider the following IF instruction:
('IF', 17,0,'ARG2','0','19','18')

In this example, the left expression is 'ARG2' (this notation is used to reference to the second argument of the function). The right expression is 0. If the result of the logic AND is TRUE (i.e., ARG2==0), then the IF instruction handler will set the PC 348 to the PC value block 19 (the TRUE block of the IF instruction). If the result of the logic AND is FALSE (i.e., ARG2≠0), the IF instruction handler sets the PC 348 to the PC value associated with block 18 (the False block of the IF instruction).

The IF instruction handler also adds the PC value of the other one of the blocks of the IF instruction to the alternative execution path. For example, if the result of the logic AND is TRUE, the IF instruction handler adds the PC value associated with the FALSE block of the IF instruction to the alternative execution path. The execution and emulation module 344 also executes the alternative execution path to ensure that the both the TRUE and FALSE paths of the code are considered.

As described above, the tuple objects are constructed to emulate the (native) Objective-C code (or Swift code) of the iOS app 204. The execution and emulation engine 344 emulates the logic functionality of predetermined Objective-C objects of the iOS app 204. For example only, the predetermined Objective-C objects may include NSString, NSURL, NSURLQueryItem, NSArray, NSURLComponents, and/or one or more other Objective-C objects for deep linking in iOS.

The following table is illustrative of an example of how an Objective-C code instruction (isEqualToString( )) may be mapped with an equivalent Python instruction.

| Objective-C | Python instruction |
|---|---|
| Object: NSString | Class: NSString |
| Method: | Method: isEqualToString(cls, aString) |
| (BOOL)isEqualToString: | |
| (NSString*)aString | Description: Returns a Boolean value that indicates whether a given string is equal to the receiver using a literal Unicode-based comparison. Implementation: def isEqualToString(cls, aString): if cls.string == aString: return 0 return −1 |
| Description: Returns a Boolean value that indicates whether a given string is equal to the receiver using a literal Unicode-based comparison. Implementation: Unknown | |

The logic of the predetermined Objective-C objects is implemented to allow for execution of the CALL instructions properly and to deduce the type of run-time objects used. As an example, consider the following CALL instruction:

('CALL',0,0,'None','v_0x1e10a6L','None',
  'v_0x1e1080L','isEqualToString:',['com.foursquare.batman.venue'],'?')

Because the execution and emulation module 344 understands that the invoked method is 'isEqualToString:', the object/class must be of type NSString. This means that 'v_0x1e1080L', which represents a runtime object, is of type NSString.

In order to determine which NSURL objects are valid, the execution and emulation module 344 may change (e.g., invert) the "meaning" of a logic function. In the case of the method 'isEqualToString:', the execution and emulation module 344 understands that in order to satisfy the condition, the two strings being compared must be equal. The same logic is also applied to other types of objects. The execution and emulation module 344 deems an NSURL object valid when the condition is satisfied.

To "assist" the execution and emulation module 344, the types of the arguments are used. For example, in the case of continueUserActivity, the method as defined by Apple is:
  (BOOL)application:(UIApplication *_Nonnull)application continueUserActivity:(NSUserActivity *_Nonnull)userActivity restorationHandler:(void (^_Nonnull)(NSArray *_Nullable restorableObjects))restorationHandler In this case, the execution and emulation module 344 understands that the second argument (ARG2) to the method is of type NSUserActivity. In the example case of application:handleOpenURL:, the method as defined by Apple is:
  (BOOL)application:(UIApplication *_Nonnull)application handleOpenURL:(NSURL *_Nonnull)url In this case, the execution and emulation module 344 understands that the second argument (ARG2) to the method is of type NSURL. As stated above, the execution and emulation module 344 identifies valid NSURL objects.

NSURL objects represent URLs. The execution and emulation module 344 extracts the URLs of valid NSURL objects. The URLs of valid NSURL objects are the deep links of the iOS app 204. The execution and emulation module 344 stores the deep links of the iOS app 204 in memory, such as in a deep link data store 356.

FIG. 10 includes an example intermediate representation. After the above loading, execution, and emulation of the core methods (e.g., NSURL host, NSString isEqualToString), the following deep links will be identified from the valid NSURL objects/instances:
  ://page/main
  ://page/page1
  ://page/page2
  ://page/page3.

The above examples do not include the scheme (appearing before ://), but the execution and emulation module 344 may extract the scheme for the deep links from the plist file associated with the iOS app 204. The plist file will be downloaded with the iOS app 204.

FIG. 11 includes an example intermediate representation generated based on a portion of the Etsy iOS app. After the above loading, execution, and emulation of the core methods (e.g., NSURL host, NSString isEqualToString), the following deep links will be identified from the valid NSURL objects/instances:
  etsy://purchases
  etsy://home The deep links of the iOS app 204 can be used under a variety of circumstances. For example, when a user initiates search via another iOS app (e.g., the Safari app) that returns a relevant result within the iOS app 204, the other iOS app can deep link into the iOS app 204 and directly to the relevant result. In return, the other iOS app may receive a credit, monetary or otherwise, for deep linking into the iOS app 204.

Figure 12:
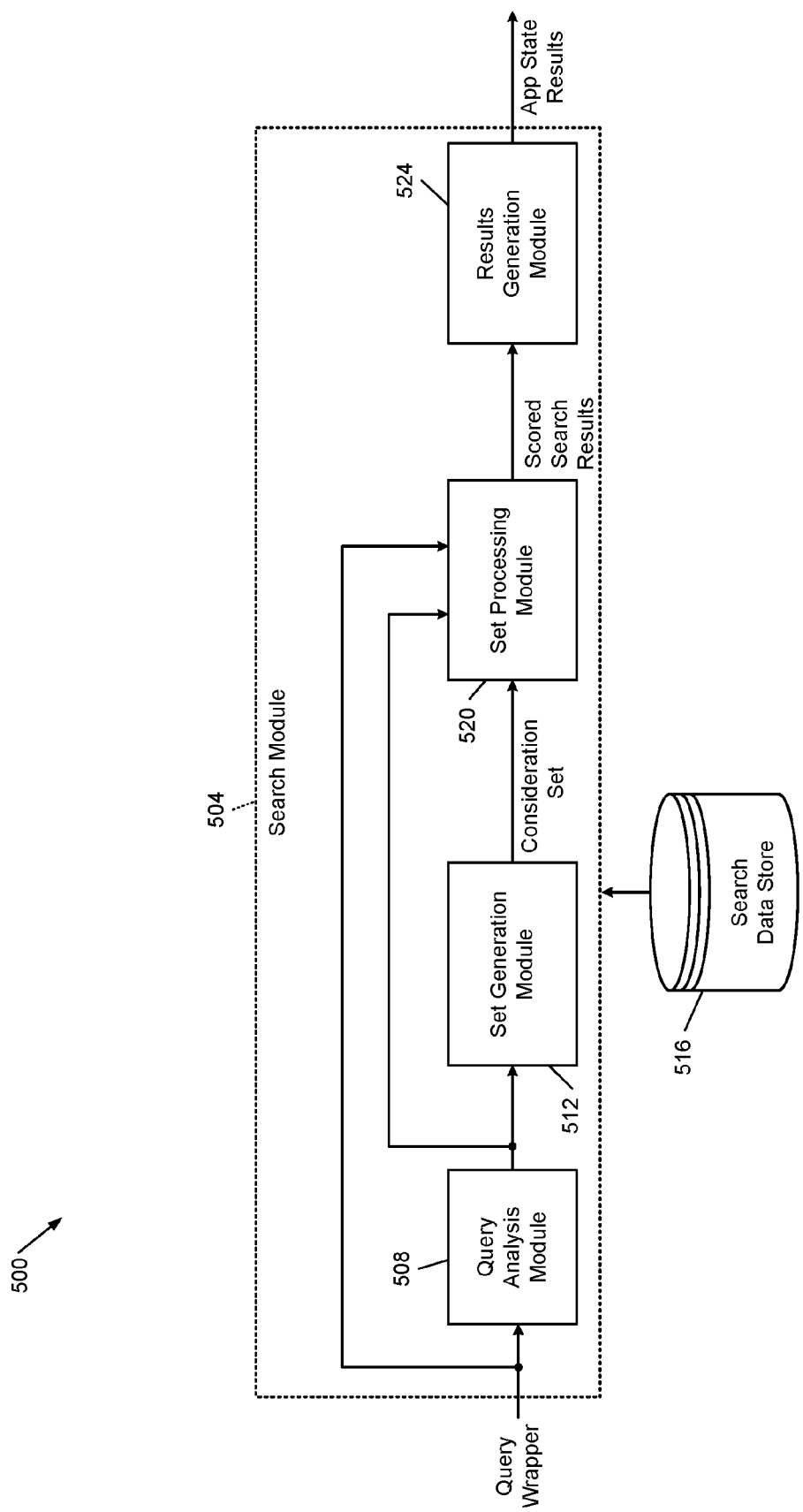
FIG. 12 is a functional block diagram of an example implementation of a search system.

FIG. 12 includes a functional block diagram of an example search system 500. A search module 504 includes a query analysis module 508 that receives a query wrapper. In various implementations, a textbox allows a user of an iOS device to type, speak, paste, or otherwise supply text. In this example, the text is sent in the query wrapper to the search system 500. The search system 500 analyzes the query wrapper, identifies relevant results, and responds to the iOS device with results. These results may take the form of one or more deep view cards (DVCs), each DVC having an associated deep link into an iOS app.

The query analysis module 508 analyzes the text query from the query wrapper. For example, the query analysis module 508 may tokenize the query text, filter the query text, and perform word stemming, synonymization, and stop word removal. The query analysis module 508 may also analyze additional data stored within the query wrapper. The query analysis module 508 provides the tokenized query to a set generation module 512.

The set generation module 512 identifies a consideration set of app state records from a search data store 516 based on the query tokens. In various implementations, the search data store 516 may also include app records. An app record may be stored as an app state record that simply has a predetermined value, such as null, for the specific state of the app.

App state records in the search data store 516 may be generated by crawling and scraping iOS apps. Some or all of the contents of the records of the search data store 516 may be indexed in inverted indices. The set generation module 512 may use, for example, the APACHE LUCENE software library by the Apache Software Foundation to identify records from the inverted indices. The set generation module 512 may search the inverted indices to identify records containing one or more query tokens.

As the set generation module 512 identifies matching records, the set generation module 512 can include the unique ID of each identified record in the consideration set. For example, the set generation module 512 may compare query terms to an app state name and app attributes (such as a text description and user reviews) of an app state record.

Further, in some implementations, the set generation module 512 may determine an initial score of the record with respect to the search query. The initial score may indicate how well the contents of the record matched the query. For example, the initial score may be a function of term frequency-inverse document frequency (TF-IDF) values of the respective query terms.

A set processing module 520 receives unique IDs of app state records identified by the set generation module 512 and determines a result score for some or all of the IDs. A result score indicates the relevance of an app state with respect to the tokenized query and context parameters. In various implementations, a higher score indicates a greater perceived relevance.

In other words, the set processing module 520 evaluates each candidate record from the consideration set in light of how relevant the candidate record is to the query wrapper as well as to the analyzed version of the query from the query analysis module 508. For example, the query analysis module 508 may infer a user's intent and identify multiple possible parses of the query. Each parse may be associated with a likelihood, and the set processing module 520 may produce a score for a record based on a dot product of how well the record matches each query parse and how likely each query parse is. This gives higher weight to those records that are more relevant to the more likely query parses.

Beyond textual data, other items in the query wrapper may act as context parameters. Geolocation data may limit the score of (or simply remove altogether) apps that are not pertinent to the location of the user device from which the query was made. A blacklist in the query wrapper may cause the set processing module 520 to remove app records and/or app state records from the consideration set that match the criteria in the blacklist, or to set their score to a null value, such as zero.

The set processing module 520 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 520 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 520 may pair the search query with each app state ID and calculate a vector of features for each {query, ID} pair. The vector of features may include one or more record scoring features, one or more query scoring features, and one or more record-query scoring features. In some implementations, the set processing module 520 normalizes the scoring features in the feature vector. The set processing module 520 can set non-pertinent features to a null value or zero.

The set processing module 520 may then input the feature vector for one of the app state IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 520 can calculate result scores for each of the IDs that the set processing module 520 receives. The set processing module 520 associates the result scores with the respective IDs and outputs the most relevant scored IDs.

A results generation module 524 may choose specific access mechanisms from the app records and app state records chosen by the set processing module 520. The results generation module 524 then prepares a results set to return to the iOS device. Although called "app state results" here, some of the access mechanisms may correspond to a default state (such as a home page) of an app—these may be a special case of an app state record or may be an app record.

The results generation module 524 may select an access mechanism for an app state record based on whether the app is installed on the iOS device. If the app is installed, an access mechanism that opens the app directly to the specified state is selected. Meanwhile, if the app is not installed, a selected access mechanism first downloads and installs the app, such as via a script, before opening the app to the specified state. Opening the app to the specified state may include a single command or data structure that directly actuates the specified state. For other apps, a script or other sequence may be used to open the app to a certain state (such as a home, or default, state) and then navigate to the specified state.

The results generation module 524 may generate or modify access mechanisms based on the operating system identity and version for the user device to which the results are being transmitted. For example, a script to download, install, open, and navigate to a designated state may be fully formed for a specific operating system by the results generation module 524.

If the results generation module 524 determines that none of the native access mechanisms are likely to be compatible with the iOS device, the search module 500 may send a web access mechanism to the iOS device. If no web access mechanism is available or would be incompatible with the iOS device for some reason (for example, if the web access mechanism relies on a programming language which is not installed on the iOS device), the results generation module 524 may omit the result.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A computer system comprising a processing system and a non-transitory computer-readable medium storing instructions for execution on the processing system, wherein the instructions implement:
   a disassembler module configured to generate Acorn RISC (reduced instruction set computing) Machine (ARM) code by performing a disassembly of binary code of a compiled iOS application;
   an intermediate representation generator module configured to:
      (i) from the ARM code, identify an implementation of a predetermined method of providing a deep link into the iOS application; and
      (ii) generate intermediate representation code by formatting portions of the ARM code having predetermined patterns according to predetermined instructions associated with the predetermined patterns, respectively;
   a loader module configured to translate the intermediate representation code into executable code including objects in a tuple format and to load the executable code for execution; and
   an execution and emulation module configured to:
      (i) execute the executable code line by line to identify NSURL objects;
      (ii) emulate the NSURL objects to identify valid ones of the NSURL objects;
      (iii) determine deep links for the valid ones, of the NSURL objects, respectively; and
      (iv) store the deep links in memory.

2. The computer system of claim 1 wherein the intermediate representation generator module is configured to identify the implementation of the predetermined method of providing a deep link from a predetermined portion of the ARM code.

3. The computer system of claim 1 wherein the intermediate representation generator module is configured to identify the implementation of the predetermined method of providing a deep link by verifying that a name of a method included in a predetermined portion of the ARM code is the same as a name of the predetermined method.

4. The computer system of claim 1 wherein the disassembler module is configured to generate the ARM code by performing the disassembly using the Interactive DisAssembler (IDA) from Hex-Rays.

5. The computer system of claim 1 wherein, by performing the disassembly, the disassembler module is configured to generate one of: 32 bit ARM code; and 64 bit ARM code.

6. The computer system of claim 1 wherein the predetermined method of providing a deep link includes one of:
 (i) application:openURL:sourceApplication:annotation; and
 (ii) handle OpenURL:sourceApplication:annotation.

7. The computer system of claim 1 wherein the loader module is configured to translate the intermediate representation code into executable code including objects in a tuple format.

8. The computer system of claim 1 wherein the predetermined instructions include CALL functions, conditional IF instructions, and unconditional GOTO instructions.

9. The computer system of claim 1 wherein the execution and emulation module is configured to determine that one of the NSURL objects is valid when a condition of the one of the NSURL objects is satisfied.

10. A system comprising:
 the computer system of claim 1; and
 a search system configured to provide a plurality of search results to a user iOS device in response to a search query,
 wherein at least one of the plurality of search results includes data about a deep state of the iOS application and a deep link corresponding to the deep state of the iOS application.

11. A non-transitory computer readable medium comprising code that, when executed by a processor:
 generates Acorn RISC (reduced instruction set computing) Machine (ARM) code by performing a disassembly of binary code of a compiled iOS application;
 from the ARM code, identifies an implementation of a predetermined method of providing a deep link into the iOS application;
 generates intermediate representation code by formatting portions of the ARM code having predetermined patterns according to predetermined instructions associated with the predetermined patterns, respectively;
 translates the intermediate representation code into executable code including objects in a tuple format;
 loads the executable code for execution;
 executes the executable code line by line to identify NSURL objects;
 emulates the NSURL objects to identify valid ones of the NSURL objects;
 determines deep links for the valid ones, of the NSURL objects, respectively; and
 stores the deep links.

12. The non-transitory computer readable medium of claim 11 wherein the code, when executed, identifies the implementation of the predetermined method of providing a deep link from a predetermined portion of the ARM code.

13. The non-transitory computer readable medium of claim 11 wherein the code, when executed, identifies the implementation of the predetermined method of providing a deep link by verifying that a name of a method included in a predetermined portion of the ARM code is the same as a name of the predetermined method.

14. The non-transitory computer readable medium of claim 11 wherein the code, when executed, generates the ARM code by performing the disassembly using the Interactive DisAssembler (IDA) from Hex-Rays.

15. The non-transitory computer readable medium of claim 11 wherein the code, when executed, generates one of (i) 32 bit ARM code and (ii) 64 bit ARM code by performing the disassembly.

16. The non-transitory computer readable medium of claim 11 wherein the predetermined method of providing a deep link includes one of:
 (i) application:openURL:sourceApplication:annotation; and
 (ii) handle OpenURL:sourceApplication:annotation.

17. The non-transitory computer readable medium of claim 11 wherein the code, when executed, translates the intermediate representation code into executable code including objects in a tuple format.

18. The non-transitory computer readable medium of claim 11 wherein the predetermined instructions include CALL functions, conditional IF instructions, and unconditional GOTO instructions.

19. The non-transitory computer readable medium of claim 11 wherein the code, when executed, determines that one of the NSURL objects is valid when a condition of the one of the NSURL objects is satisfied.

20. A system comprising:
 the non-transitory computer readable medium of claim 11; and
 a search system configured to provide a plurality of search results to a user iOS device in response to a search query,
 wherein at least one of the plurality of search results includes data about a deep state of the iOS application and a deep link corresponding to the deep state of the iOS application.

* * * * *